US010125598B2

(12) United States Patent
Dykstra et al.

(10) Patent No.: US 10,125,598 B2
(45) Date of Patent: Nov. 13, 2018

(54) OPTIMIZED ROTATION OF A DRILL STRING DURING SLIDING MODE OF DIRECTIONAL DRILLING

(71) Applicant: Halliburton Energy Services, Inc., Houston, TX (US)

(72) Inventors: Jason D. Dykstra, Carrollton, TX (US); Zhijie Sun, Plano, TX (US)

(73) Assignee: Halliburton Energy Services, Inc., Houston, TX (US)

(*) Notice: Subject to any disclaimer, the term of this patent is extended or adjusted under 35 U.S.C. 154(b) by 445 days.

(21) Appl. No.: 14/907,765

(22) PCT Filed: Aug. 30, 2013

(86) PCT No.: PCT/US2013/057689
§ 371 (c)(1),
(2) Date: Jan. 26, 2016

(87) PCT Pub. No.: WO2015/030820
PCT Pub. Date: Mar. 5, 2015

(65) Prior Publication Data
US 2016/0168973 A1 Jun. 16, 2016

(51) Int. Cl.
*E21B 44/04* (2006.01)
*E21B 7/06* (2006.01)
(Continued)

(52) U.S. Cl.
CPC .............. *E21B 44/04* (2013.01); *E21B 3/02* (2013.01); *E21B 7/06* (2013.01); *E21B 7/068* (2013.01);
(Continued)

(58) Field of Classification Search
USPC ..................... 703/2, 10; 175/24, 50
See application file for complete search history.

(56) References Cited

U.S. PATENT DOCUMENTS 5,135,532 A * 8/1992 Baker ............... A61B 17/1695
408/206
6,446,737 B1 9/2002 Fontana et al.
(Continued)

FOREIGN PATENT DOCUMENTS

| CN | 1798903 A | 7/2006 |
|---|---|---|
| CN | 101466911 | 6/2009 |
| CN | 101512098 A | 8/2009 |
| WO | 2007-129120 A1 | 11/2007 |

OTHER PUBLICATIONS

International Search Report and Written Opinion issued in related PCT Application No. PCT/US2013/057689 dated May 15, 2014, 13 pages.
(Continued)

*Primary Examiner* — Thai Q Phan
(74) *Attorney, Agent, or Firm* — Alan Bryson; Baker Botts L.L.P.

(57) ABSTRACT

An example method for optimized rotation of a drill string coupled to a drill bit and disposed within a borehole may comprise determining an angular velocity of at least part of the drill string. An angular velocity threshold to avoid static friction may also be determined. Additionally, a minimum input torque to apply to the drill string to maintain the angular velocity at or above the angular velocity threshold may be determined. The method may further include generating a control signal to a top drive motor based, at least in part, on the minimum input torque.

20 Claims, 6 Drawing Sheets

(51) Int. Cl.
*E21B 7/10* (2006.01)
*E21B 3/02* (2006.01)
*G05B 13/04* (2006.01)
*G05D 13/62* (2006.01)

(52) U.S. Cl.
CPC .............. *E21B 7/10* (2013.01); *G05B 13/041* (2013.01); *G05D 13/62* (2013.01)

(56) References Cited

U.S. PATENT DOCUMENTS

| | | |
|---|---|---|
| 6,918,452 B2 | 7/2005 | Chan et al. |
| 2004/0118612 A1 | 6/2004 | Haci et al. |
| 2006/0162962 A1 | 7/2006 | Koederitz et al. |
| 2009/0065258 A1 | 3/2009 | Hamilton |
| 2014/0116776 A1* | 5/2014 | Marx ...................... E21B 44/00 175/24 |
| 2015/0218914 A1* | 8/2015 | Marx ...................... E21B 44/00 175/24 |

OTHER PUBLICATIONS

International Preliminary Report on Patentability issued in related PCT Application No. PCT/US2013/057689 dated Jun. 30, 2015, 7 pages.

Office Action issued in related Chinese Application No. 201380077367.7, dated Aug. 16, 2016 (18 pages).

* cited by examiner

OPTIMIZED ROTATION OF A DRILL STRING DURING SLIDING MODE OF DIRECTIONAL DRILLING

CROSS-REFERENCE TO RELATED APPLICATION

The present application is a U.S. National Stage Application of International Application No. PCT/US2013/057689 filed Aug. 30, 2013, which is incorporated herein by reference in its entirety for all purposes.

BACKGROUND

The present disclosure relates generally to well drilling operations and, more particularly, to optimized rotation of a drill string during a sliding mode of a direction drilling operation.

Conventionally, a drill string may be rotated from the surface to rotate a drill bit during drilling. In certain directional drilling applications, a downhole mud motor with a bent housing is used to rotate the drill bit, while any rotation applied to the drill string from the surface is temporarily suspended. When a mud motor is used to rotate the drill bit and at time when the rate of penetration of the drill bit is relatively low, part of the drill string may become stationary and cause static friction to form. The static friction can be broken by compressing the drill string until the stored energy is greater that the static frictional force. When the stored energy is released it will transfer the energy to the drill bit, which can be detrimental to the drill bit. In certain existing operations, the drill string may be partially rotated to prevent the drill string from becoming stationary. The existing mechanisms for controlling the partial rotation of the drill string, however, are energy inefficient.

FIGURES

Some specific exemplary embodiments of the disclosure may be understood by referring, in part, to the following description and the accompanying drawings.

Figure 1:
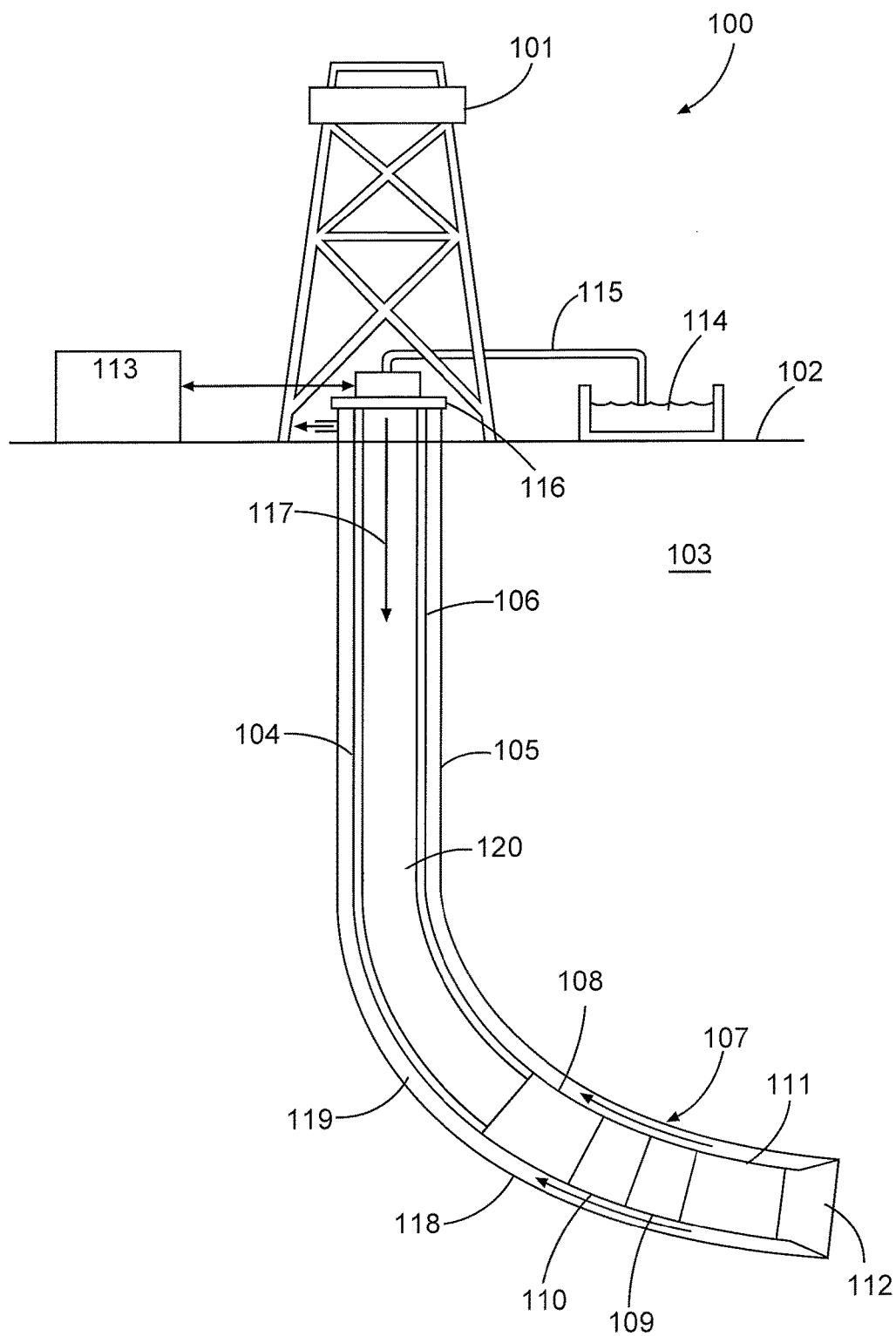
FIG. 1 is a diagram illustrating an example directional drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to optimized rotation of a drill string during a sliding mode of a direction drilling operation.

Illustrative embodiments of the present disclosure are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. The indefinite articles "a" or "an," as used herein, are defined to mean one or more than one of the elements that it introduces.

FIG. 1 is a diagram illustrating an example directional drilling system 100, according to aspects of the present disclosure. As used herein, a directional drilling system may be a subterranean drilling system in which at least one of an inclination or an azimuthal orientation of the drill bit is purposely deviated to contact, penetrate, or intersect a target. For example, directional drilling systems may be used to penetrate a subterranean reservoir to produce hydrocarbons. Directional drilling systems may also be used to follow an existing borehole within a formation or to intersect an existing well that has blown out.

In the embodiment shown, the directional drilling system 100 comprises a rig 101 positioned at the surface 102 above a formation 103. Although the rig 101 is shown on land in FIG. 1, the rig 101 may be used at sea, with the surface 102 comprising a drilling platform. The rig 101 may be coupled to a drilling assembly 104 that is drilling a borehole 105 within the formation 103. The drilling assembly 104 may comprise a drill string 106, a bottom hole assembly (BHA) 107, and a bent sub 108. The drill string 106 may comprise a plurality of tubulars that are coupled together through threaded connections. The BHA 107 may comprise one or more LWD or MWD systems 109, a telemetry system 110, a mud motor 111, and a drill bit 112. The bent sub 108 may comprise a joint with a fixed or variable angle that controls at least one of the inclination and azimuthal direction of the drilling assembly 104 generally, and the drill bit 112 in particular. In certain embodiments, the bent sub 108 may be incorporated into the BHA 107 or positioned at a different location along the drill string 106. In certain embodiments, the direction drilling system 100 may comprise a mud motor that includes a bent housing rather than the separate bent sub 108 shown in FIG. 1.

The LWD/MWD system 109 may comprise downhole measurement or logging instruments, including magnetometers, accelerometers, antennas, etc. The telemetry system 110 may provide a communications pathway between the LWD/MWD system 109 and other downhole system and the surface control unit 113. For example, the telemetry system 110 may comprise a mud pulser that communicates with the surface control unit 113 through a series of pressure pulses within drilling mud in the borehole 105.

In the embodiment shown, the surface control unit 113 may comprise an information handling system. As used herein, information handling systems may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

During drilling operations, drilling mud may be pumped from a reservoir 114 into a bore 120 of the drilling assembly 104 through a pipe 115. Once introduced into the bore 120 of the drilling assembly 104, the drilling mud may flow away from the surface as shown with arrow 117. The drilling mud may exit the drilling assembly 104 through fluid ports within the drill bit 112. As the drilling mud exits the drill bit 112, it may lubricate and cool the cutting face of the drill bit 112 and carry cuttings from the drill bit 112 to the surface 102. The drilling mud 115 may flow to the surface 102, as shown with arrow 118, within an annulus 119 between the drilling assembly 104 and the wall of the borehole 105.

The mud motor 111 may include at least one element within the flow of drilling fluid 117 that converts energy from the flow of drilling fluid 117 into rotary motion. For example, the mud motor 111 may include a turbine that rotates in response to a fluid flow. The turbine may drive an output shaft that may be coupled, directly or indirectly through gear assemblies and other drive elements, to drill bit 112. Accordingly, when drilling mud is being pumped into the drilling assembly 104, the drill bit 112 may rotate and cut into formation 103. Notably, by rotating the drill bit 112 with the mud motor 111 rather than the drill string 106, the azimuthal orientation of the bent sub 108 and the drill bit 112 may remain substantially constant while the borehole 105 is being drilling. However, when the rate of penetration of the drilling assembly 104 is low, part of the drill string 106 may become stationary, causing static friction to form between the drill string 106 and the wall of the borehole 105. This static friction must be overcome before drilling can continue.

According to aspects of the present disclosure, the static friction generally may be avoided or reduced by continuously rotating the drill string 106. In certain embodiments, the input torque may be optimized so that it is the minimum input torque required to continuously rotate the drill string 106 without rotating the drill bit 112, which would alter its azimuthal orientation. The optimized torque/rotation may be alternatively imparted in a first direction and a second direction to allow for a substantially continuous rotation without rotating the drill bit. In certain embodiments, the minimum input torque may be applied to the drill string 106 through a top drive 116 coupled to the drill string 106. The top drive 116 may be coupled to surface control unit 113 and may comprise a motor that imparts torque to the drill string 106 based, at least in part, on a command signal generated by the surface control unit 113. For example, the top drive 116 may include a controller that receives the command signal from the surface control unit 113 and causes the motor within the top drive 116 to impart a certain torque to the drill string 106. In other embodiments, the command signal from the surface control unit 113 may control the motor directly. In other embodiments, the command signal may be generated at an information handling system incorporated within the top drive 106.

As described above, surface control unit 113 may comprise a processor and at least one memory device. The at least one memory device may comprise a set of instructions that, when executed by the processor, cause the processor to determine an angular velocity of at least part of the drill string 106, determine an angular velocity threshold to avoid static friction, determine a minimum input torque to apply to the drill string to maintain the angular velocity at or above the angular velocity threshold, and generate a control signal to a top drive motor that is based, at least in part, on the minimum input torque. The minimum input torque may correspond to a minimum input torque that is intended to substantially avoid static friction on the drill string while expending the lowest amount of energy. In certain embodiments, surface control unit 113 also may receive measurements from downhole sensors regarding certain real-time downhole conditions, such as an angular velocity, which may be used as feedback to the minimum input torque determination, as will be described below. In certain embodiments, surface control unit 113 also may calculate or determine certain values, such as an angular velocity, using a mathematical model of the drill string 106, rather than an actual measurement value. In certain embodiments, surface control unit 113 may comprise a plurality of information handling systems that cooperate to perform the functions described above.

Figure 2:
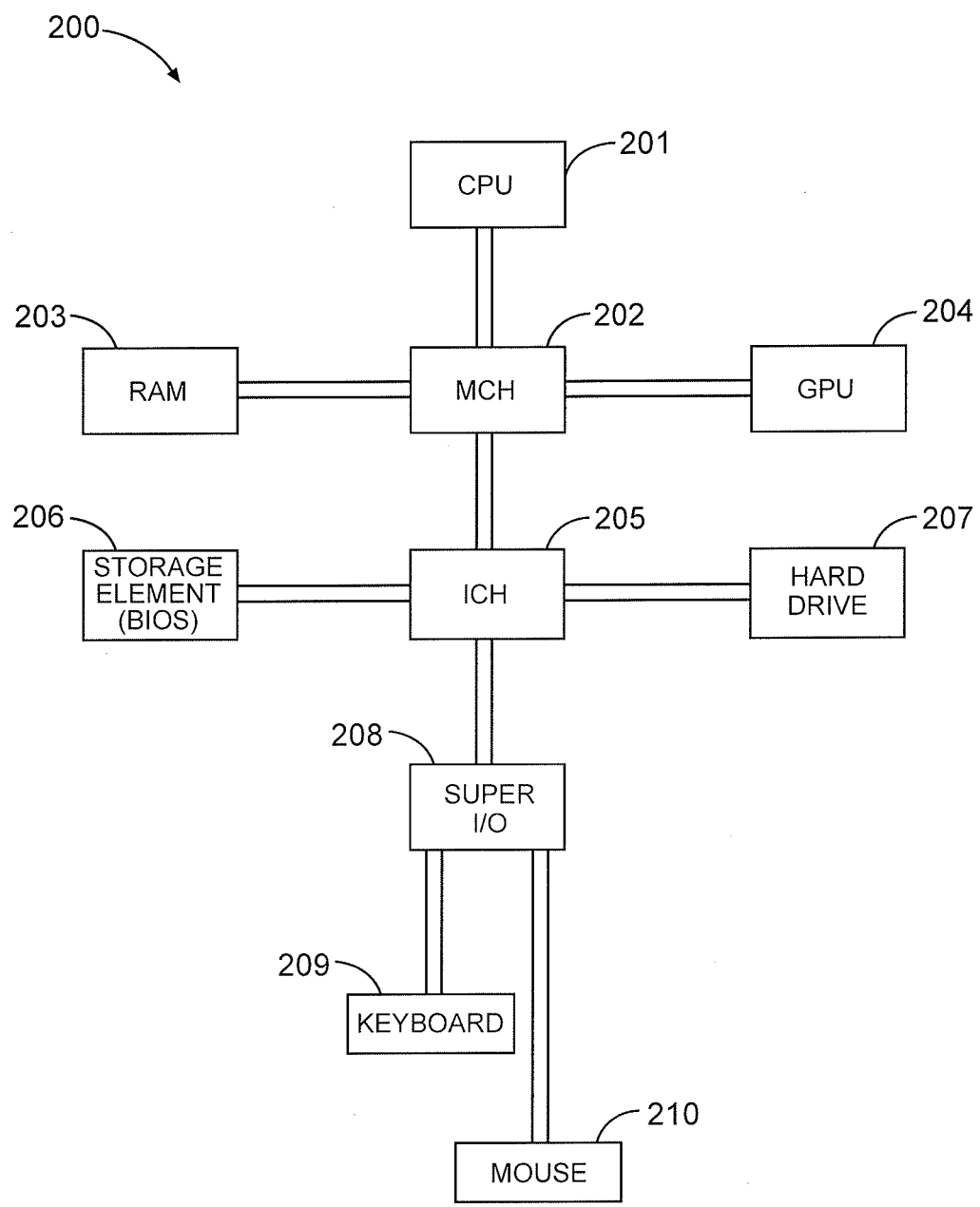
FIG. 2 is a diagram illustrating an example information handling system, according to aspects of the present disclosure.

FIG. 2 is a diagram illustrating an example information handling system 200, according to aspects of the present disclosure. A processor or CPU 201 of the information handling system 200 is communicatively coupled to a memory controller hub or north bridge 202. Memory controller hub 202 may include a memory controller for directing information to or from various system memory components within the information handling system 200, such as RAM 203, storage element 206, and hard drive 207. The memory controller hub 202 may be coupled to RAM 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210. In certain embodiments, the Super I/O chip 208 may be used to transmit command signals to a top drive, similar to the top drive 116 in FIG. 1.

According to aspects of the present disclosure, an information handling system may use at least one cost function to determine the minimum torque force required to continuously rotate the drill string without rotating the drill bit. As will be described below, the at least one cost function may be used in conjunction with a mathematical model of a directional drilling system or may be used with system feedback without a mathematical model of the directional drilling system.

Figure 3A:
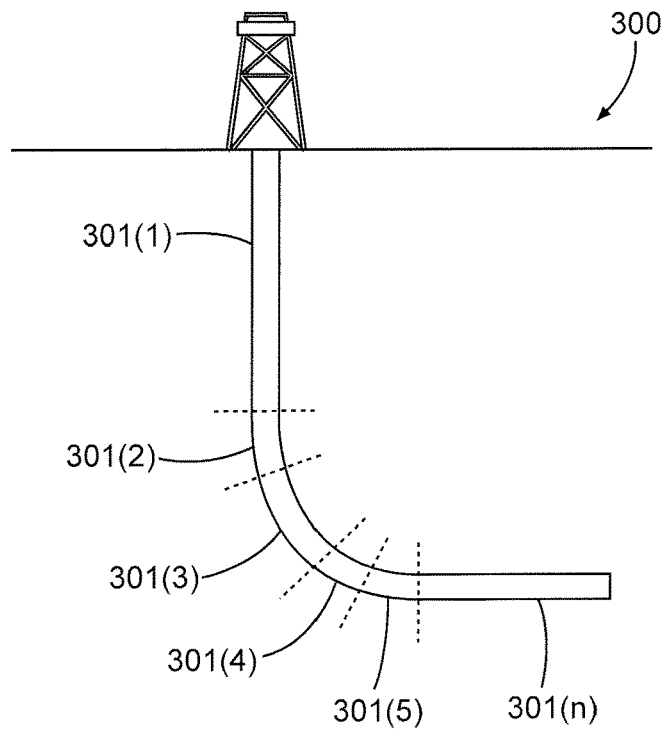
FIGS. 3A and 3B are diagrams illustrating an example directional drilling system model, according to aspects of the present disclosure.
Figure 3B:
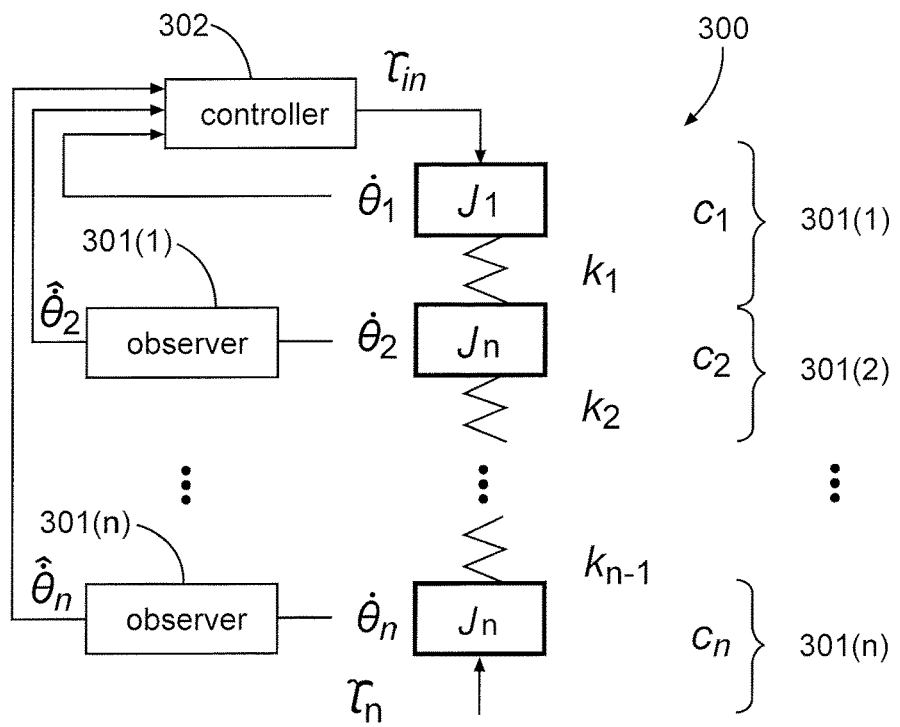

FIGS. 3A and 3B are diagrams illustrating an example mathematical model of a directional drilling system that may be used to determine a minimum input torque. In certain embodiments, the model may comprise a lumped mass model where the drilling assembly is divided into segments that are individually modeled as a single-mass spring system. FIG. 3A is a diagram illustrating an example directional drilling system that has been subdivided into a plurality of segments 301(1)-(n). Each of the segments 301(1)-(n) may be modeled as a single-mass spring system, with each of the segments 301(1)-(n) corresponding to a different inertia J, friction coefficient c, and spring coefficient k. The last segment 301(n) of the model 300 may comprise the segment immediately above the drill bit and the bent sub. As will be described below, the torque may be optimized such that the angular velocity of the segment 301(n) is such that it avoids static friction, while not transmitting torque to the drill bit, which needs to remain azimuthally stationary.

FIG. 3B is a diagram illustrating the example lumped mass model 350 that includes single-mass spring systems corresponding to each of the segments 301(1)-(n). Each of the segments 301(1)-(n) may be connected in series. As can be seen, a torque $\tau_{in}$ may be applied to the first segment 301(1) from a controller 302. The controller 302 may be similar to the surface control unit 113 in FIG. 1, and may also comprise a controller within a top drive. Each of the segments 301(1)-(n) may have a corresponding angular orientation θ, angular velocity θ˙, and angular acceleration θ¨. The dynamics of each segment may be characterized using the following equation:

$$J_i - k_{i-1}(\theta_i - \theta_{i-1}) + k_i(\theta_{i+1} - \theta_i) - c_i \ast m_i \ast r \ast \cos \varphi_i + \tau_{ext} = 0$$

where $\theta_0 = \theta_1$ and $\theta_{n+1} = \theta_n$; $\tau_{ext}$ is either the torque applied at the surface through the top drive (i=1) or the reactive torque of the rock on the drill bit (i=n); $m_i$ is the mass for segment i; and r is the radius of the drill string. The friction coefficient $c_i$ for each segment may be expressed as follows:

$$c_i = c_{i,s} \text{ when } \dot\theta_i = 0; c_{i,k} \text{ when } \dot\theta_i > 0$$

where $c_{i,s}$ corresponds to the static friction coefficient when the angular velocity $\dot\theta_i$ of the segment is zero, and $c_{i,k}$ corresponds to the kinetic friction coefficient when the angular velocity $\dot\theta_i$ of the segment is greater and zero.

The input torque $\tau_{in}$ may cause some or all of the segments 301(1)-(n) to rotate with a particular angular velocity θ˙. For example, segment 301(2) may rotate with an angular velocity $\dot\theta_2$. In certain embodiments, each of the segments below the first segment may be coupled to a sensor assembly or observer 303(1)-(n), that will generate an estimated value $\dot{\theta e}_i$ for the corresponding angular velocity $\dot\theta_i$. The angular velocity $\dot\theta_i$ of the first segment 301(1) can be determined directly from the velocity of the top drive imparting input torque $\tau_{in}$, and therefore does not require a sensor assembly or observer.

According to certain aspects of the present disclosure, the above equations may be used to model the drilling assembly, and the model may be used in conjunction with a cost function by an information handling system to determine or calculate an minimum input torque and generate a corresponding control signal to minimize the energy required to avoid static friction on the drill string. The cost function may correspond to a model predictive control scheme that may be executed within a controller or processor coupled to a top drive. In complex systems, model predictive control schemes may predict the change in the dependent variables of the modeled system that will be caused by changes in the independent variables. Independent variables are typically variables that can be adjusted by the controller. Dependent variables comprise measurements that represent either control objectives or process constraints. As will be described below, the model predictive control scheme may use current measurements, the current dynamic state of the system, system models, and limits to calculate future changes in the dependent variables. These changes are calculated to hold the dependent variables close to a target, such as a minimum energy value, while honoring constraints on both independent and dependent variables. The model predictive control scheme may send out only the first change in each independent variable to be implemented, and repeat the calculations when the next change is required.

An example cost function may comprise the following equation (CF1):

$$\min_{\tau_{in}} \int_0^T \left[ W_1 \cdot I_{n,s}(t) + W_2 \cdot \left( \frac{d\tau_{in}}{dt} \right)^2 \right] dt$$

where $I_{n,s}(t)$ corresponds to the static friction state of the segment just above the drill bit at a given time t; 0 to T represented the time horizon for the calculation; $d\tau_{in}/dt$ corresponds to the rate of change of the input torque signals; and $W_1$ and $W_2$ are weighting factors penalizing the lack of movement of the segment above the drill bit ($W_1$) and non-smooth torque signals ($W_2$). When the drill string experiences a transition from kinetic to static friction the torque measured at the surface will change, the $d\tau_{in}/dt$ can be used to suppress unnecessary changes in torque. Additionally, the value of the static friction state variable $I_{i,s}$ of a segment may be zero if the segment is moving and one if the segment is not moving and static friction can form.

The cost function CF1 may be subject to the model of the drilling assembly as represented in the following model equations:

$$J_i \ddot{\theta}_i - k_{i-1}(\theta_i - \theta_{i-1}) + k_i(\theta_{i+1} - \theta_i) - c_i \dot{J}_i = 0 \quad \text{(M1)}$$

$$c_i = c_{i,s} * I_{i,s} + c_{i,k} * I_{i,k} \text{ with } I_{i,s} + I_{i,k} = 1 \quad \text{(M2)}$$

$$I_{i,k} * \dot{\theta}_{safe} \leq \dot{\theta}_i \quad \text{(M3)}$$

$$I_{i,s}, I_{i,k} = 0 \text{ or } 1. \quad \text{(M4)}$$

Model equations M1-M4 may represent the friction of the model in FIGS. 3A and 3B in a linear fashion. For example, the friction state variables $I_{i,s}$ and $I_{i,k}$ for a given segment may indicate whether that segment is subject to static friction forces by setting $I_{i,s}$ to 1 and $I_{i,k}$ to 0. Likewise, the friction state variables $I_{i,s}$ and $I_{i,k}$ for a given segment may indicate whether that segment is subject to kinetic friction forces by setting $I_{i,k}$ to 1 and $I_{i,s}$ to 0. This satisfies both M4 and M2, and can be used to set the friction coefficient $c_i$ to either the static friction coefficient $c_{i,s}$ or the kinetic friction coefficient $c_{i,k}$ for a given time period. Since the cost function minimizes input energy and $c_{i,s} > c_{i,k}$, $I_{i,k} = 1$ will be favored. Regarding M3, $\dot{\theta}_{safe}$ may represent the minimum speed or threshold for a segment that is considered to be in motion without formation of static friction. The value of $\dot{\theta}_{safe}$ may be selected to be as small as possible but should account for unpredictable disturbances caused by the drilling factor by including an additional safety factor. The safety factor may be chosen, for example, using operational data and a statistical analysis to ensure there is a low probability that static friction would form.

The cost function may further be subject to the following constraints:

$$\tau^{min} \leq \tau_{in} \leq \tau^{max} \quad \text{(C1)}$$

$$\int_0^T \dot{\theta}_n dt = 0 \quad \text{(C2)}$$

Equation C1, for example, restricts the torque $\tau_{in}$ to be applied to the system to the capability of the top drive mechanism. Equation C2 ensures that there is no energy stored in the drill string over the time horizon 0 to T. Although only two constraints are shown others may be added, including a limit to the rate of change of the torque.

In certain embodiments, a first input torque may be imparted to the modeled drilling assembly, and the angular velocities of each segment may be determined. From these angular velocities, it may be determined whether each of the segments is moving at or above the $\dot{\theta}_{safe}$ value to avoid static friction. Different input torque $\tau_{in}$ values may be used to identify the minimum input torque value that avoids static friction on each of the segments while imparting the smallest amount of energy. A different minimum input torque may be determined for each of a pre-determined number of time segments, with the drilling assembly model reflecting the downhole conditions caused by the optimized torque input from the previous time segment. In certain embodiments, actual downhole angular velocity measurements may be used to verify and update the model.

Figure 4A:
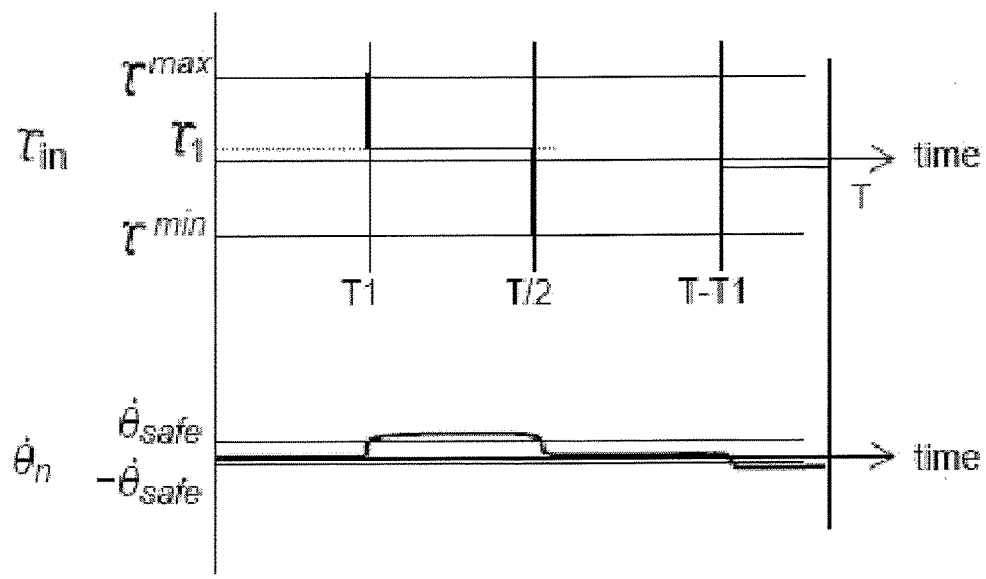
FIGS. 4A and 4B are diagrams illustrating an optimized torque input and control signal, according to aspects of the present disclosure.

An example minimum input torque $\tau_{in}$ generated using CF1 is shown in FIG. 4A. The input torque $\tau_{in}$ may be set to a maximum value $\tau^{max}$ in a first time interval T1 until most of the drill string rotates. Then, the torque $\tau_{in}$ may be reduced to a minimum value $\tau^{min}$ without forming a static state to minimize the energy required to rotate the drill string without rotating the tool face. At the conclusion of the time interval T, the direction of the input torque $\tau_{in}$ may be reversed to release the energy stored in the drill string and to wind the drill string in the opposite direction. In order to maintain movement within the drill string without rotating the drill bit, the drill string must be constantly wound and unwound, with the torque being applied in both directions, to maintain movement in the drill string without rotating the drill bit.

The minimum input torque shown in FIG. 4 may be characterized by three parameters: T, $T_1$ and $\tau_1$. The first parameter T may correspond to the period of the torque signal, with a larger value leading to more energy imparted to the drill string, and a smaller value leading to more frequent switching between directions of rotations. The second parameter $T_1$ corresponds to the time during which the top drive outputs its maximum torque. In certain embodiments, $T_1$ may be optimized such that enough energy is transmitted to rotate the bottom mass, but only fast enough to avoid static friction. The third parameter $\tau_1$ corresponds to the torque that needs to be maintained at the top after the segment above the drill bit begins to rotate.

Figure 4B:
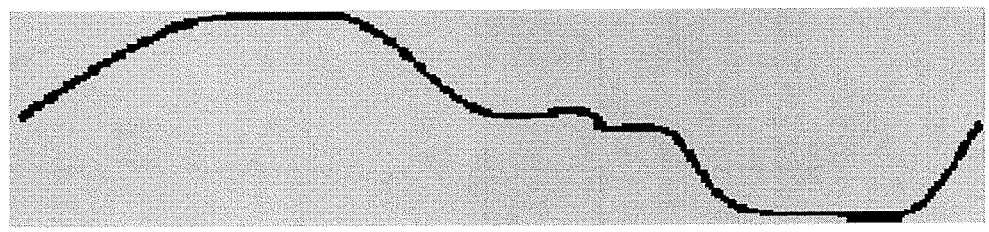

Although the minimum input torque $\tau_{in}$ may comprise a square wave, practically speaking it may be difficult to apply that type of torque to a top drive system. FIG. 4B illustrates an example control signal that is based at least in part on the minimum input torque $\tau c_{in}$ but that accounts for other constraints of the physical system. For example, the top drive for a system may have a maximum allowable current, and the current required to drive the top drive with a square wave or close to a square wave may exceed that current. With a limit on the allowable current, the angular speed of the top drive may not go up quickly, requiring a more gradual control signal, as is seen in FIG. 4B.

Figure 5:
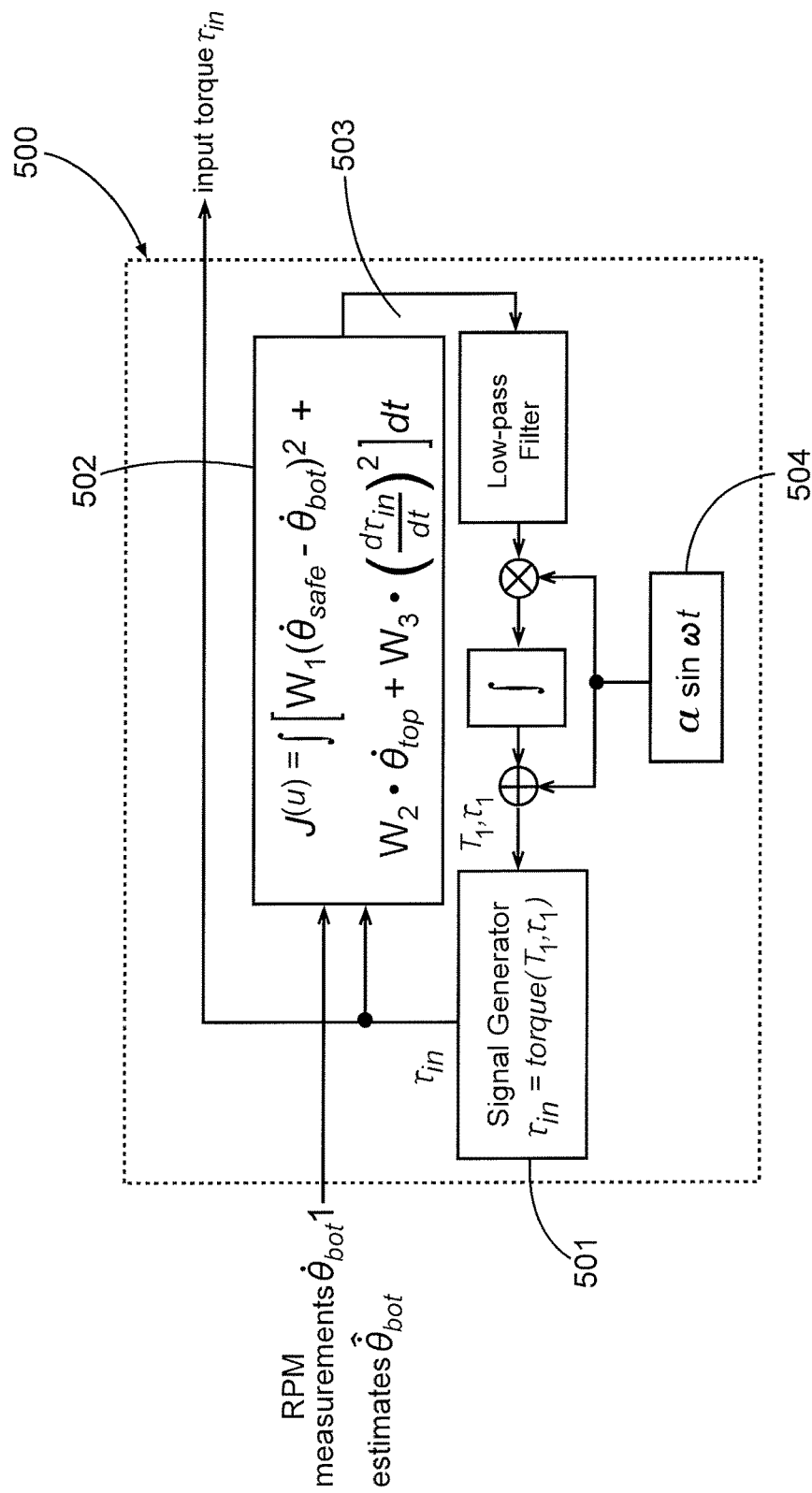
FIG. 5 is a diagram illustrating an example control system, according to aspects of the present disclosure.

According to aspects of the present disclosure, the minimum input torque may also be determined without a model, using a feedback approach. FIG. 5 is a diagram illustrating an example model-less control system, according to aspects of the present disclosure. In the embodiment shown, the control system 500 may optimize the input torque $\tau_{in}$ by calculating optimized parameters for the input torque $\tau_{in}$, such as the parameters from FIG. 4. In particular, a signal generator 501 may generate the input torque $\tau_{in}$ with a similar shape to that shown in FIG. 4, with the parameters $T_1$ and $\tau_1$ being determined using a cost function 502. The torque $\tau_{in}$ generated by the signal generator 501 may be used as an input to an optimization algorithm 502. The measured angular velocity $\theta^\bullet_{bot}$ or estimated angular velocity $\theta e^\bullet_{bot}$ of the portion of the drill string above the drill bit may also be used as an input to the cost function 502.

In certain embodiments, the cost function 502 may comprise an extremum seeking control form. For example, in the embodiment shown the cost function 502 comprises:

$$J = \int_0^T \left[ W_1(\theta_{safe} - \theta_{bot})^2 + (W_2 * \theta_{top}) + W_3\left(\frac{d\tau_{in}}{dt}\right)^2 \right] dt$$

where $\theta^\bullet_{bot}$ is either the measured angular velocity or estimated angular velocity of the portion of the drill string above the drill bit; $\theta^\bullet_{top}$ is the angular velocity at the top of the drill string connected to the top drive; $\theta^\bullet_{safe}$ is the minimum speed for a segment that is considered to be in motion without formation of static friction; $d\tau_{in}/dt$ corresponds to the rate of change of the input torque signals; and $W_1$, $W_2$, and $W_3$ are weighting factors that correspond to the bottom speed, top speed, and torque changes, respectively. The first term $(\theta^\bullet_{safe} - \theta^\bullet_{bot})^2$ quadratically increases the amount with which the angular velocity of the portion of the drill string above the drill bit falls below the minimum speed required to avoid static friction. Ideally, $\theta^\bullet_{bot}$ will approach equality $\theta^\bullet_{safe}$ to zero out this term. The second term includes $\theta^\bullet_{top}$ to minimize the speed and therefore energy required to rotate the top of the drill string. Ideally, $\theta^\bullet_{top}$ will be as low as possible to maintain the bottom of the drill string at the $\theta^\bullet_{safe}$ value. The third term corresponds to the rate of change of the torque is ideally low to reduce large torque changes.

The output of the cost function 502 may be fed through a low pass filter 503. A modulation signal 504 may used to generate perturbations in the systems to determine a gradient of the cost function 502. In the embodiment shown, the modulation signal 504 comprises a sin wt. The modulation signal 504 may be added to both $T_1$ and $\tau_1$ with different magnitude and frequency so their effect can be measure independently. After the cost function value is obtained, the modulation signal 504 is multiplied to the cost function value to demodulate the gradient information. Once the gradient is found the signal generator 501 will change the nominal torque input $\tau_{in}$ to seek the optimal operating conditions for the cost function 502.

Figure 6:
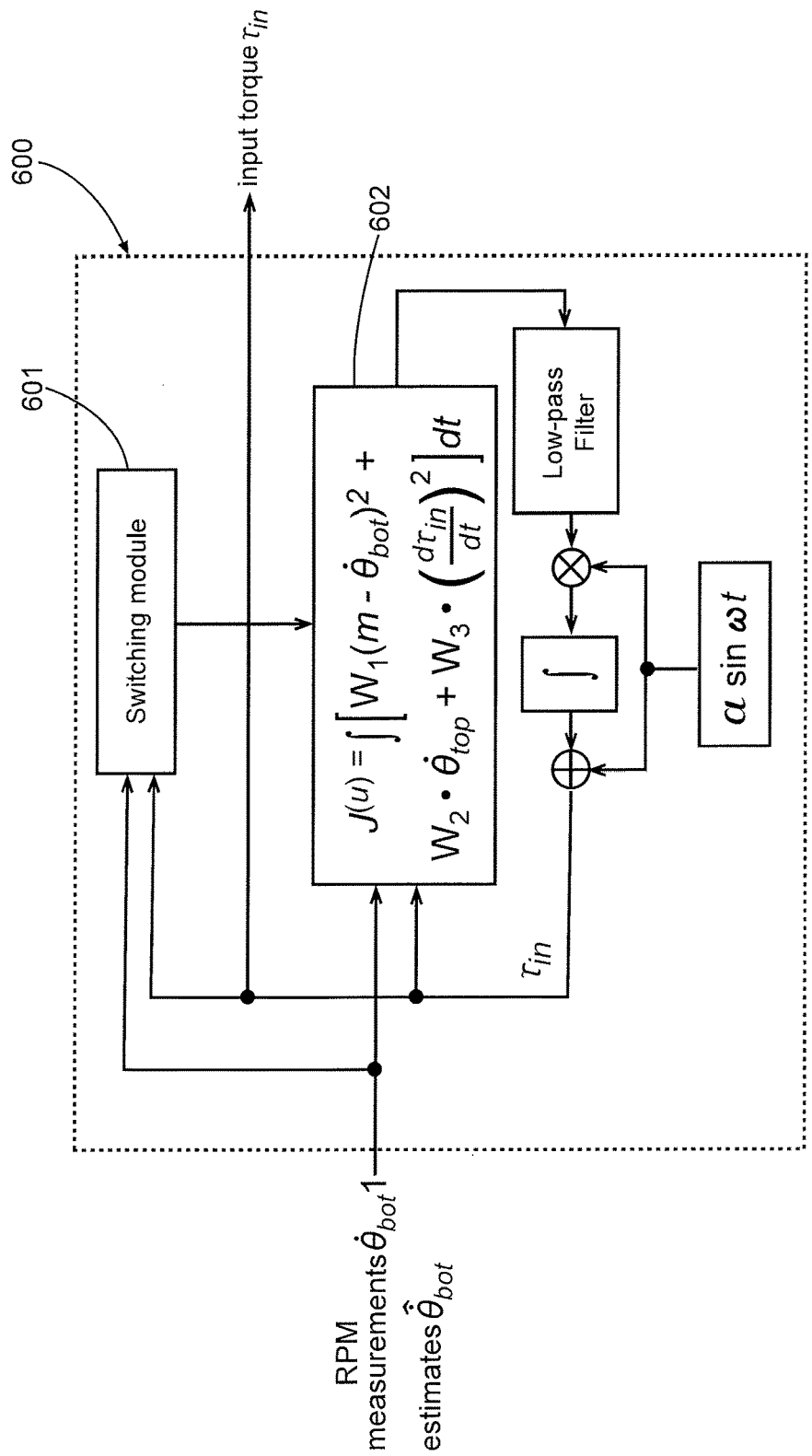
FIG. 6 is a diagram illustrating an example control system, according to aspects of the present disclosure.

FIG. 6 is a diagram illustrating an example control system 600, according to aspects of the present disclosure. Control system 600 is similar to control system 500, except that the input torque $\tau_{in}$ is not parameterized in the form shown in FIG. 4. Rather, a switching module 601 is used to tune the weights of cost function 602. For example, at first, $W_1$ and $W_3$ may be set to be 0, and $W_2$ may be a negative number. As a result, the cost function 602 tries to maximize the speed on the top, leading to a maximum input torque $\tau_{in}$. When a sudden changes in input torque is detected, or bottom speed is estimated to be greater than 0, the switching module 601 may change $W_1$ and/or $W_3$ to a very large number and $W_2$ to a small number. Under these weighting conditions, the cost function 602 may then try to keep the bottom as slow as possible, and/or to keep the input torque as smooth as possible. In certain embodiments, this control system 600 can be used to continuously control the system using the same controller by changing the weighting factors to account for the different operating modes.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for controlling rotation of a drill string coupled to a drill bit within a borehole, comprising:
   determining an angular velocity of at least part of the drill string based on a velocity of the top drive imparting input torque;
   determining an angular velocity threshold to avoid static friction;
   determining a minimum input torque to apply to the drill string to maintain the angular velocity at or above the angular velocity threshold; and
   generating a control signal to a top drive motor based, at least in part, on the minimum input torque to maintain the angular velocity of the drill string at or above the angular velocity threshold.

2. The method of claim 1, wherein determining the angular velocity of the portion of the drill string comprises one of receiving an angular velocity measurement from within the borehole and estimating the angular velocity using a mathematical model of the drill string.

3. The method of claim 2, wherein
   determining the angular velocity of at least part of the drill string comprises determining the angular velocity of a first segment of the drill string adjacent to the drill bit; and
   the first segment is one of a plurality of segments of a lumped mass model corresponding to the drill string.

4. The method of claim 3, wherein determining the minimum input torque comprises utilizing a model predictive control scheme with a cost function.

5. The method of claim 3, wherein determining the minimum input torque comprises utilizing a model predictive control scheme with the following cost function:

$$\min_{\tau_{in}} \int_0^\tau \left[ W_1 \cdot I_{n,s}(t) + W_2 \cdot \left(\frac{d\tau_{in}}{dt}\right)^2 \right] dt$$

where $I_{n,s}(t)$ corresponds to a static friction state of the first segment at a given time t; 0 to T represents the time horizon for the calculation; $d\tau_{in}/dt$ corresponds to the rate of change of the input torque; and $W_1$ and $W_2$ are weighting factors penalizing static friction on the first segment and non-smooth torque signals, respectively.

6. The method of claim 5, wherein the cost function is subject to the following model equations:

$$J_i \theta^{\bullet\bullet}_i - k_{i-1}(\theta_i - \theta_{i-1}) + k_i(\theta_{i+1} - \theta_i) - c_i J_i = 0 \quad \text{(M1)}$$

$$c_i = c_{i,s} * I_{i,s} + c_{i,k} * I_{i,k} \text{ with } I_{i,s} + I_{i,k} = 1 \quad \text{(M2)}$$

$$I_{i,k} * \theta^\bullet_{safe} \leq \theta^\bullet_i \quad \text{(M3)}$$

$$I_{i,s}, I_{i,k} = 0 \text{ or } 1; \quad \text{(M4)}$$

and the following constraint equations:

$$\tau^{min} \le \tau_{in} \le \tau^{max} \quad \text{(C1)}$$

$$\int_o^T \theta_n dt = 0 \quad \text{(C2)}$$

where $\theta_i$ corresponds to an angular orientation of a segment of the lumped mass model; $\theta^*_i$ corresponds to an angular velocity of a segment of the lumped mass model; $\theta^{**}_i$ corresponds to an angular acceleration of a segment of the lumped mass model; $J_i$ corresponds to an inertia of a segment of the lumped mass model; $c_i$ corresponds to a friction coefficient of a segment of the lumped mass model; $c_{i,s}$ corresponds to a static friction coefficient of a segment of the lumped mass model; $c_{i,k}$ corresponds to a kinetic friction coefficient of a segment of the lumped mass model; $k_i$ corresponds to a spring coefficient of a segment of the lumped mass model; $I_{i,s}$ comprises a static friction state of a segment of the lumped mass model; $I_{i,k}$ comprises a kinetic friction state of a segment of the lumped mass model; $\theta^*_{safe}$ corresponds to the angular velocity threshold, $\tau^{min}$ corresponds to the minimum torque value of the top drive; and $\tau^{max}$ comprises the maximum torque value of the top drive.

7. The method of claim 2, wherein determining the minimum input torque comprises receiving at least one feedback signal corresponding to an operational state of the drill string.

8. The method of claim 2, wherein determining the minimum input torque comprises solving the following cost function:

$$J = \int_0^T \left[ W_1(\theta_{safe} - \theta_{bot})^2 + (W_2 * \theta_{top}) + W_3 \left(\frac{d\tau_{in}}{dt}\right)^2 \right] dt$$

where $\theta^*_{bot}$ comprises one of the measured angular velocity or estimated angular velocity of the portion of the drill string; $\theta^*_{top}$ comprises an angular velocity at the top of the drill string; $\theta^*_{safe}$ comprises the angular velocity threshold; $d\tau_{in}/dt$ corresponds to the rate of change of the input torque; and $W_1$, $W_2$, and $W_3$ comprise weighting factors.

9. The method of claim 8, wherein generating the control signal comprises receiving an input torque parameter that is based, at least in part, on the cost function.

10. The method of claim 8, wherein determining the minimum input torque comprises altering at least one of the weighting factors.

11. An apparatus for rotation of a drill string coupled to a drill bit within a borehole, comprising:
a processor; and
a memory device coupled to the processor, wherein the memory device includes a set of instructions that, when executed by the processor, cause the processor to
determine an angular velocity of at least part of the drill string based on a velocity of the top drive imparting input torque;
determine an angular velocity threshold to avoid static friction;
determine a minimum input torque to apply to the drill string to maintain the angular velocity at or above the angular velocity threshold; and
generate a control signal to a top drive motor based, at least in part, on the minimum input torque to maintain the angular velocity of the drill string at or above the angular velocity threshold.

12. The apparatus of claim 11, wherein the set of instructions that cause the processor to determine the angular velocity of the portion of the drill string further cause the processor to perform one of receive an angular velocity measurement from within the borehole and estimate the angular velocity using a mathematical model of the drill string.

13. The apparatus of claim 12, wherein
the at least part of the drill string comprises a first segment of the drill string adjacent to the drill bit; and
the first segment is one of a plurality of segments of a lumped mass model corresponding to the drill string.

14. The apparatus of claim 13, wherein the set of instructions that cause the processor to determine the minimum input torque further cause the processor to utilize a model predictive control scheme with a cost function.

15. The apparatus of claim 14, wherein the cost function comprises:

$$\min_{\tau_{in}} \int_0^T \left[ W_1 \cdot I_{n,s}(t) + W_2 \cdot \left(\frac{d\tau_{in}}{dt}\right)^2 \right] dt$$

where $I_{n,s}(t)$ corresponds to a static friction state of the first segment at a given time t; 0 to T represents the time horizon for the calculation; $d\tau_{in}/dt$ corresponds to the rate of change of the input torque; and $W_1$ and $W_2$ are weighting factors penalizing static friction on the first segment and non-smooth torque signals, respectively.

16. The apparatus of claim 15, wherein the cost function is subject to the following model equations:

$$J_i\theta^{**}{}_i - k_{i-1}(\theta_i - \theta_{i-1}) + k_i(\theta_{i+1} - \theta_i) - c_i J_i = 0 \quad \text{(M1)}$$

$$c_i = c_{i,s} * I_{i,s} + c_{i,k} * I_{i,k} \text{ with } I_{i,s} + I_{i,k} = 1 \quad \text{(M2)}$$

$$I_{i,k} * \theta^*_{safe} \le \theta^*_i \quad \text{(M3)}$$

$$I_{i,s}, I_{i,k} = 0 \text{ or } 1; \quad \text{(M4)}$$

and the following constraint equations:

$$\tau^{min} \le \tau_{in} \le \tau^{max} \quad \text{(C1)}$$

$$\int_o^T \theta_n dt = 0 \quad \text{(C2)}$$

where $\theta_i$ corresponds to an angular orientation of a segment of the lumped mass model; $\theta^*_i$ corresponds to an angular velocity of a segment of the lumped mass model; $\theta^{**}_i$ corresponds to an angular acceleration of a segment of the lumped mass model; $J_i$ corresponds to an inertia of a segment of the lumped mass model; $c_i$ corresponds to a friction coefficient of a segment of the lumped mass model; $c_{i,s}$ corresponds to a static friction coefficient of a segment of the lumped mass model; $c_{i,k}$ corresponds to a kinetic friction coefficient of a segment of the lumped mass model; $k_i$ corresponds to a spring coefficient of a segment of the lumped mass model; $I_{i,s}$ comprises a static friction state of a segment of the lumped mass model; $I_{i,k}$ comprises a kinetic friction state of a segment of the lumped mass model; $\theta^*_{safe}$ corresponds to the angular velocity threshold; $\tau_{min}$ corresponds to the minimum torque value of the top drive; and $\tau^{max}$ comprises the maximum torque value of the top drive.

17. The apparatus of claim 12, wherein the set of instructions that cause the processor to determine the minimum input torque further cause the processor to receive at least one feedback signal corresponding to an operational state of the drill string.

18. The apparatus of claim 12, wherein the set of instructions that cause the processor to determine the minimum input torque further cause the processor to solve the following cost function:

$$J = \int_0^T \left[ W_1(\theta_{safe} - \theta_{bot})^2 + (W_2 * \theta_{top}) + W_3\left(\frac{d\tau_{in}}{dt}\right)^2 \right] dt$$

where $\theta^*_{bot}$ comprises one of the measured angular velocity or estimated angular velocity of the portion of the drill string; $\theta^*_{top}$ comprises an angular velocity at the top of the drill string; $\theta^*_{safe}$ comprises the angular velocity threshold; $d\tau_{in}/dt$ corresponds to the rate of change of the input torque; and $W_1$, $W_2$, and $W_3$ comprise weighting factors.

19. The apparatus of claim 18, wherein the set of instructions that cause the processor to generate the control signal further cause the processor to determine an input torque parameter that is based, at least in part, on the cost function.

20. The apparatus of claim 18, wherein the set of instructions that cause the processor to determine the minimum input torque further cause the processor to alter at least one of the weighting factors.

* * * * *